US008874022B2

(12) United States Patent
Kayaba et al.

(10) Patent No.: US 8,874,022 B2
(45) Date of Patent: Oct. 28, 2014

(54) SHEET PLACEMENT UNIT, POST-PROCESSING APPARATUS AND IMAGE FORMING SYSTEM

(75) Inventors: Zen Kayaba, Toyohashi (JP); Satoru Shimizu, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 390 days.

(21) Appl. No.: 12/633,033

(22) Filed: Dec. 8, 2009

(65) Prior Publication Data

US 2010/0148416 A1 Jun. 17, 2010

(30) Foreign Application Priority Data

Dec. 17, 2008 (JP) ................................. 2008-320730

(51) Int. Cl.

*G03G 15/00* (2006.01)
*B65H 31/26* (2006.01)
*B65H 31/02* (2006.01)
*B65H 29/66* (2006.01)
*B65H 31/28* (2006.01)

(52) U.S. Cl.

CPC ............ *B65H 29/6618* (2013.01); *B65H 31/26* (2013.01); *B65H 2404/262* (2013.01); *B65H 2404/1521* (2013.01); *B65H 31/02* (2013.01); *B65H 2701/1932* (2013.01); *G03H 2215/00877* (2013.01); *B65H 2701/1313* (2013.01); *B65H 2513/50* (2013.01); *B65H 2511/51* (2013.01); *G03G 15/6538* (2013.01); *B65H 31/28* (2013.01); *B65H 2801/27* (2013.01); *G03G 2221/1696* (2013.01)

USPC ............................ 399/407; 399/405; 271/220

(58) Field of Classification Search

USPC .......... 399/405, 407, 408, 410, 409; 271/220, 271/221–224, 265.04, 279; 270/4, 45, 270/58.07; 412/22, 23

See application file for complete search history.

(56) References Cited

U.S. PATENT DOCUMENTS 5,249,793 A * 10/1993 Scheufler ...................... 271/220
6,449,459 B2 * 9/2002 Tamehira et al. ............. 399/405

(Continued)

FOREIGN PATENT DOCUMENTS

JP 7-323957 A 12/1995
JP 11-193162 A 7/1999

(Continued)

OTHER PUBLICATIONS

Japanese Office Action drafted Nov. 7, 2012 (and English translation thereof) in counterpart Japanese Application No. 2008-320730.

*Primary Examiner* — Ren Yan
*Assistant Examiner* — Justin Olamit
(74) *Attorney, Agent, or Firm* — Holtz, Holtz, Goodman & Chick PC

(57) ABSTRACT

A sheet placement unit on which a plurality of sheet bundles having been produced by folding a plurality of sheets are stacked while being overlapped. The sheet placement unit includes a sheet placement section on which the folded sheet bundle having been provided with a folding process is loaded, the sheet placement section being inclined so that a downstream side of the sheet placement section in a sheet conveying direction is higher than another side, a sheet conveyance device to convey the sheet bundle loaded on the sheet placement section in a sheet conveying direction while the plurality of sheet bundles are overlapped, and a sheet holding device provided swingably above the sheet placement section, the sheet holding device comprising a sheet contacting section which comes in contact an upper surface of the sheet bundle loaded on the sheet placement section.

6 Claims, 9 Drawing Sheets

(56) References Cited

U.S. PATENT DOCUMENTS

| | | | | | |
|---|---|---|---|---|---|
| 7,669,849 | B2 * | 3/2010 | Liu et al. | ........................ | 271/272 |
| 7,681,872 | B2 | 3/2010 | Hayashi | | |
| 2006/0244200 | A1 * | 11/2006 | Someya et al. | ............... | 271/145 |
| 2008/0214377 | A1 * | 9/2008 | Kamiya | ........................ | 493/421 |

FOREIGN PATENT DOCUMENTS

| | | | | | |
|---|---|---|---|---|---|
| JP | 11193162 | A * | 7/1999 | ............. | B63H 31/00 |
| JP | 2007-062969 | A | 3/2007 | | |
| JP | 2008-184311 | A | 8/2008 | | |

* cited by examiner

SHEET PLACEMENT UNIT, POST-PROCESSING APPARATUS AND IMAGE FORMING SYSTEM

This application is based on Japanese Patent Application No. 2008-320730 filed on Dec. 17, 2008 with Japanese Patent Office, the entire content of which is hereby incorporated by reference.

BACKGROUND OF THE INVENTION

The present invention relates to a sheet placement unit where the sheet bundle to which the folding process has been carried out is loaded, and the post-processing apparatus equipped with the sheet placement unit, the image forming system which includes the post-processing apparatus, and image forming apparatus, such as a copying machine and a printer.

Conventionally a post-processing apparatus carrying out the following processes is well known. The post-processing apparatus collects sheet-shaped papers (hereinafter referring to the sheet-shaped paper as only "sheet"), to each of which image forming has been carried out, into a bundle of plural sheets (hereinafter referring to as "sheet bundle"). After binding them, the post-processing apparatus performs a folding process and conveys the folded sheet bundle while the folding section is made into the leading edge, and accumulates the folded sheet bundles with a part of each of them overlapped with each other on a sheet ejection tray.

When a thick sheet or a sheet bundle which has been produced by folding multiple sheets is folded, the sheet tends to swell near the folding section and when loading this sheet bundle on a sheet ejection tray, it has had a problem that the pile of the sheet bundles is apt to collapse. Moreover, there has been also a problem that the leading edge of bundle of subsequent sheet enters the open folding section of precedent sheet, and a problem that the leading edge of the subsequent sheet bundle bumps into the trailing edge of the precedent sheet bundle, and pushes the precedent sheet bundle out from a sheet ejection tray.

The technique of equipping a stopper movable in the sheet conveying direction on a sheet ejection tray as a measure for these problems, and moving the stopper according to the increase of the sheet bundles conveyed into is disclosed (for example, refer to Unexamined Japanese Patent Application Publication No. 11-193162).

FIG. 9 is a figure showing the structure of a loading tray (sheet ejection tray) 32 disclosed in Unexamined Japanese Patent Application Publication No. 11-193162, and an operation of the loading stopper 37. FIG. 9*a* is a figure showing a state in which the loading quantity is small, and FIG. 9*b* is a figure showing a state in which the quantity is large.

The numerals 30 and 31 of FIG. 9 show the discharge rollers which discharge sheet bundle Pa, the numeral 35 shows a sheet holding arm and the numeral 35*a* shows the rotating shaft of the sheet holding arm 35, the numeral 35*b* shows the end of the sheet holding arm 35, and the numeral 35*c* shows a projection. Further, the numeral 45 shows the sheet height detection sensor which detects the height of the sheet holding arm 35. Inching of the loading stopper 37 is carried out in the sheet conveying direction A by a driving motor which is not illustrated so that sheet bundle Pa may be loaded smoothly, whenever new sheet bundle Pa is discharged.

However, in the technique disclosed by Unexamined Japanese Patent Application Publication No. 11-193162, a structure which makes the loading stopper 37 movable and a structure which makes the loading stopper 37 return to the initial location after termination of a series of the post-processing are required. Accordingly as a mechanism to return the loading stopper 37 or a driving motor capable of forward/reverse rotation is needed, it is easy to cause a higher cost. Moreover, generally, the sheet ejection tray of the post-processing apparatus which has a folding process and a binding process is installed at a lower portion of the post-processing apparatus in many cases, and when a sheet ejection tray extends horizontally, it needs to bend at the waist to take the sheet bundle, and it is a problem of not having enough workability.

On the other hand, the structure in which the sheet ejection tray is not level and is inclined in the direction so that the downstream-side of the sheet conveying direction becomes higher is also disclosed (for example, refer to Unexamined Japanese Patent Application Publication No. 2008-184311).

FIG. 10 is a figure for describing an operation for folded sheet bundles (paper sheet bundles) Pa1, Pa2, and Pa3 in the inclined folded bundle tray (sheet ejection tray) 840 disclosed by Unexamined Japanese Patent Application Publication No. 2008-184311.

In FIG. 10, the numerals 802, 803, 804 and 805 represent a flapper, a storage guide, a slippage roller, and sheet positioning member respectively. The numerals 813, 820, 840 and 842 represent a sheet bundle conveyance guide, a stapler, a sheet ejection tray and the 2nd loading surface respectively. The numerals 844 and 845 represent conveyer belts. Moreover, the numerals 849 and 860 represent a bundle detection sensor and a press unit (the 2nd folding device) respectively, and Pa1, Pa2, and Pa3 represent sheet bundles.

FIG. 10 shows the state where sheet bundle Pa1 is returned in the opposite direction (right) to the sheet conveying direction after the 2nd folding process of subsequent sheet bundle Pb2 by the press unit 860, after sheet bundle Pa1 is discharged on the sheet ejection tray 840 and it is conveyed leftward in the figure by the rotation of conveyor belts 844 and 845. By returning sheet bundle Pa1 in the opposite direction (right) of the sheet conveying direction, the lap of sheet bundle Pa1 over subsequent sheet bundle Pa2 is ensured.

In the technique which is disclosed by Unexamined Japanese Patent Application Publication No. 2008-184311, since it is easy to produce a swell near the folding section when using a thick sheet or a sheet bundle which is produced by folding multiple sheets, and as the sheet ejection tray 840 inclines, there is a possibility of remaining the problem that the lap of sheet bundles collapses easily. Moreover, because a forward/reverse rotation of the conveyor belts 844 and 845 is carried out while plural sheet bundles are loaded, there is a problem that the loaded sheet bundle collapses more easily. Further, like Unexamined Japanese Patent Application Publication No. 11-193162, since a driving motor which is capable of forward/reverse rotation is needed, it results in higher cost. Furthermore, it is worried that the leading edge of a consecutive sheet bundle enters the open part of the trailing edge of the sheet bundle which has been folded.

An aspect of the present invention is as follows.

1. A sheet placement unit on which a plurality of sheet bundles are loaded so that the plurality of sheet bundles are overlapped, with each sheet bundle of the plurality of sheet bundles having been produced by providing a folding process to a plurality of sheets and the sheet placement unit including a sheet placement section on which the sheet bundle having been provided with the folding process is loaded, and which is inclined so that a downstream side of the sheet placement section in the sheet conveying direction is higher than another side, a sheet conveyance device to convey the sheet bundle loaded on the sheet placement section in the sheet conveying direction while the plurality of sheet bundles are overlapped, and a sheet holding device provided swingably above the sheet placement section and including a sheet contacting section which comes in contact with an upper surface of the sheet bundle loaded on the sheet placement section.

2. A post-processing apparatus including a folding device for providing a folding process to the sheet bundle including a plurality of sheets, and the sheet placement unit of the abovementioned item 1.

3. An image forming system including the post-processing apparatus of the abovementioned item 2, a first control device which makes the sheet conveyance device convey the sheet bundle having been loaded on the sheet placement section in the sheet conveying direction when a sheet bundle having been provided with the folding process and being conveyed is placed on the sheet bundle having been loaded, and which stops the sheet conveyance device by detecting that a trailing edge of the sheet bundle having been provided with the folding process and being conveyed has arrived at the predetermined standby position by the sheet position detecting device, and an image forming apparatus including a plurality of mechanism sections for forming an image on a sheet, and a second control device which controls an operation of the plurality of mechanism sections and which is capable of communication with the first control device.

Figure 4A:
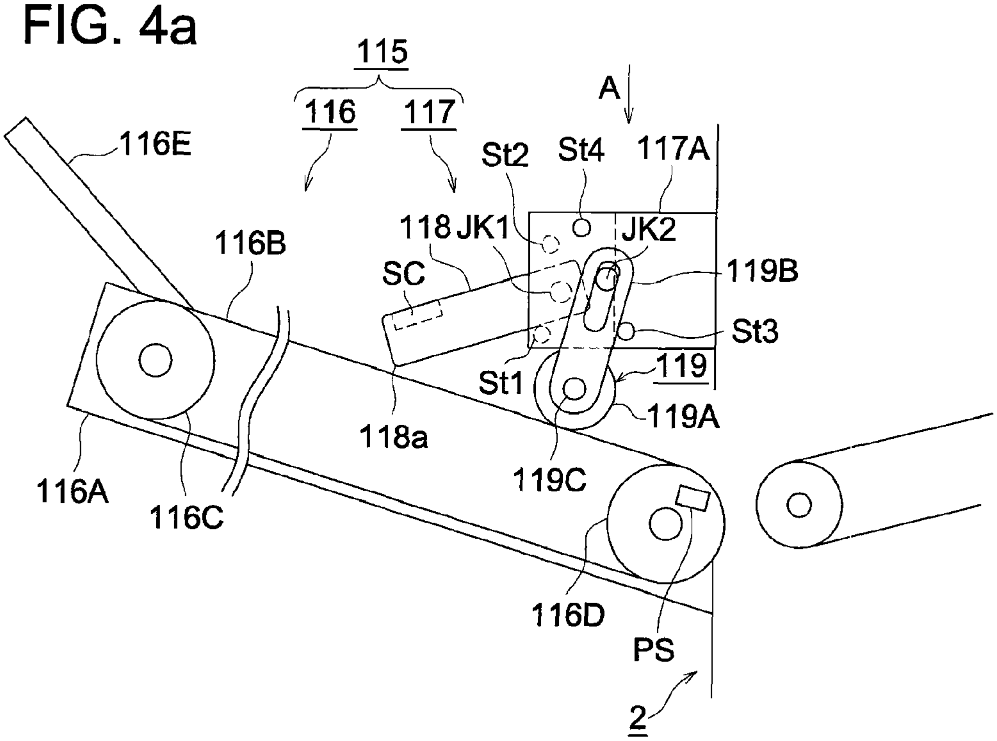
Figure 4B:
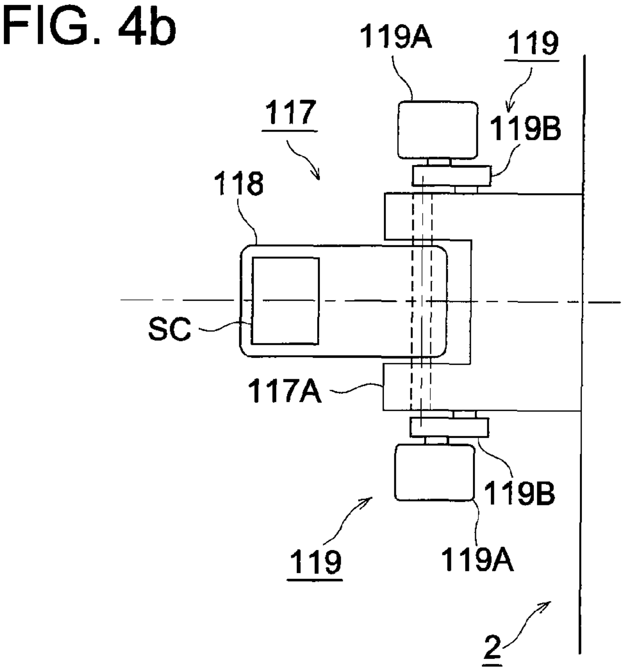

Each of FIGS. 4*a* and 4*b* is a schematic diagram showing the structure of the embodiment of the sheet bundle tray as a sheet placement unit relating to the present invention.

Figure 5A:
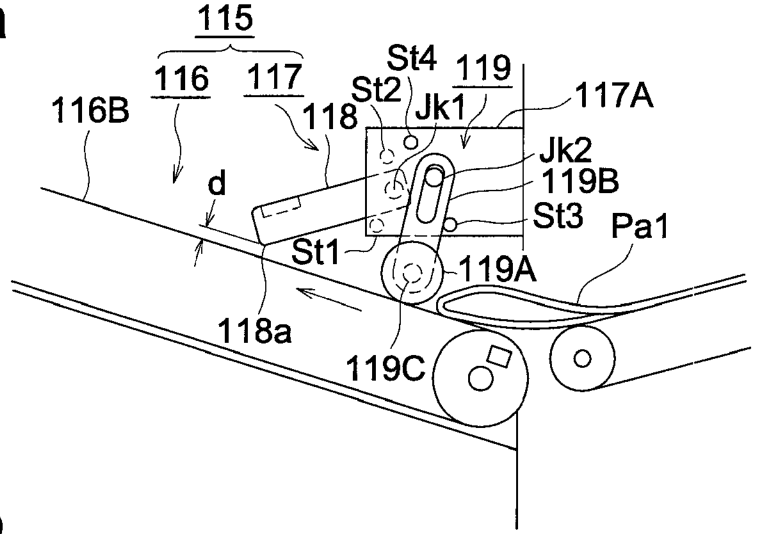
Figure 5B:
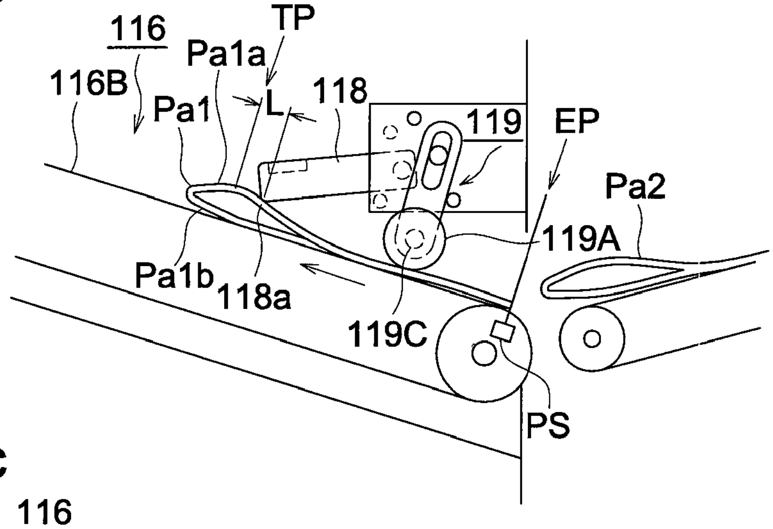
Figure 5C:
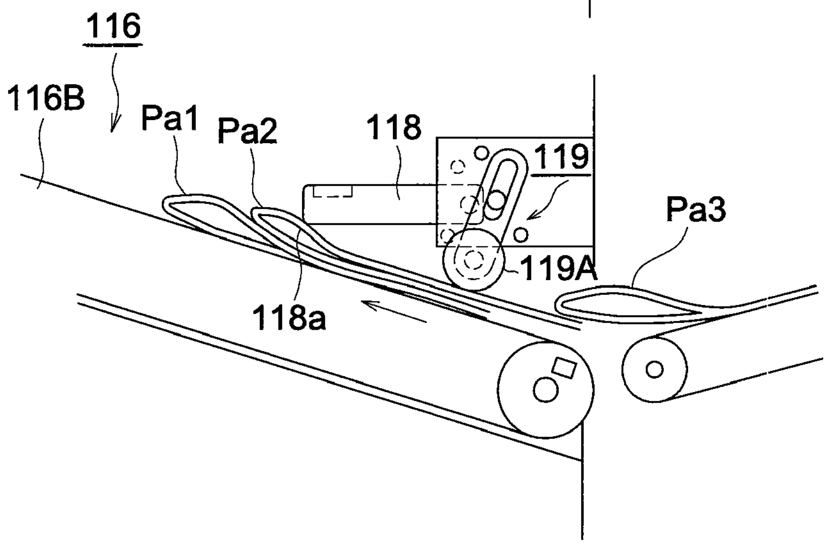

Each of FIGS. 5*a*, 5*b* and 5*c* is a schematic diagram for describing the state where a folded sheet bundle is discharged by the sheet placement unit 115.

Figure 6A:
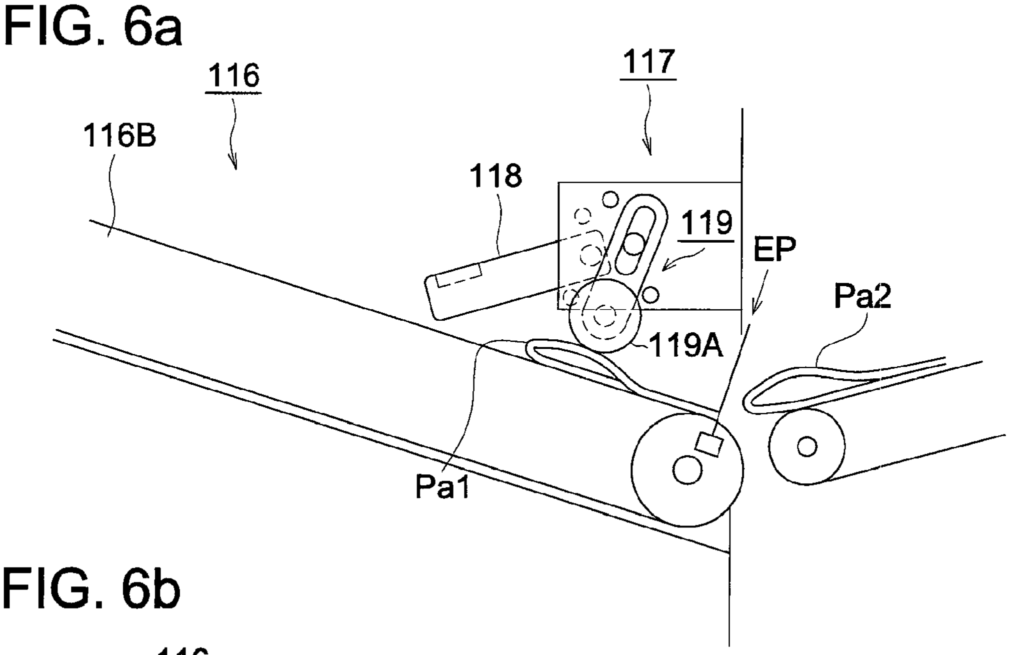
Figure 6B:
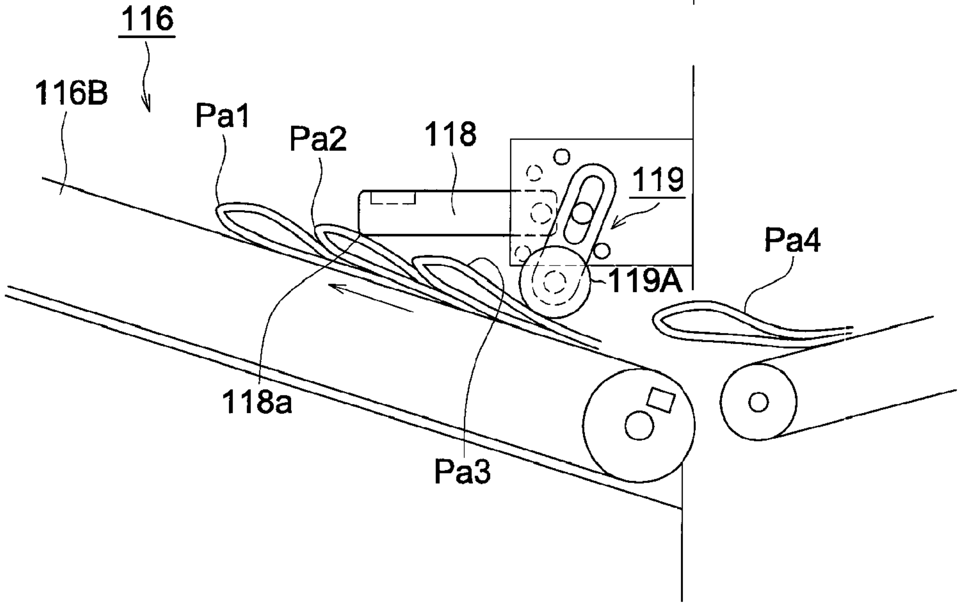

Each of FIGS. 6*a* and 6*b* is a schematic diagram for describing the state where a folded sheet bundle is discharged by the sheet placement unit 115.

Figure 7:
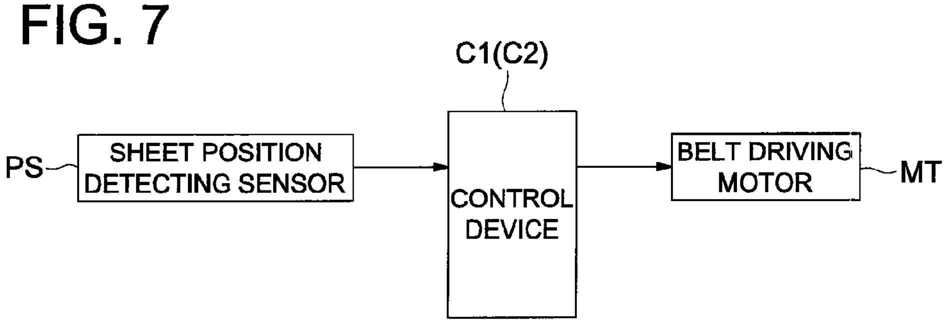

FIG. 7 is a block diagram for controlling the operation for the embodiment of the sheet placement unit relating to the present invention.

Figure 8:
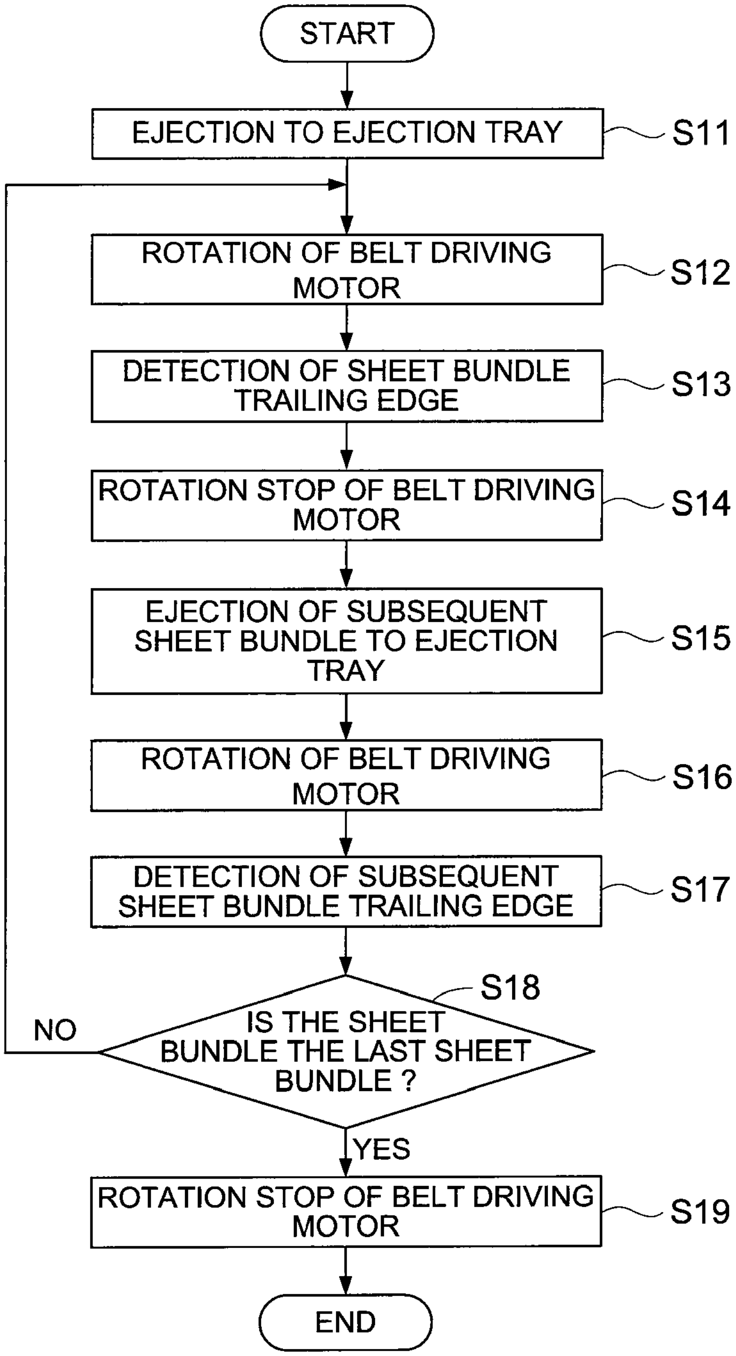

FIG. 8 is a flow chart for describing the process of the operation for the embodiment of the sheet placement unit relating to the present invention.

Figure 9A:
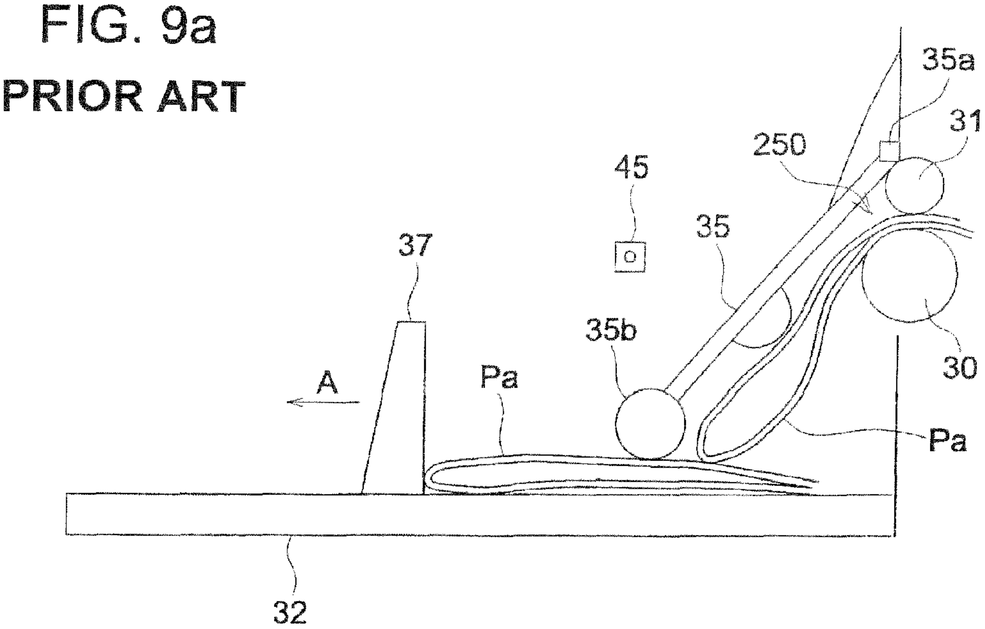
FIG. 9a PRIOR ART
Figure 9B:
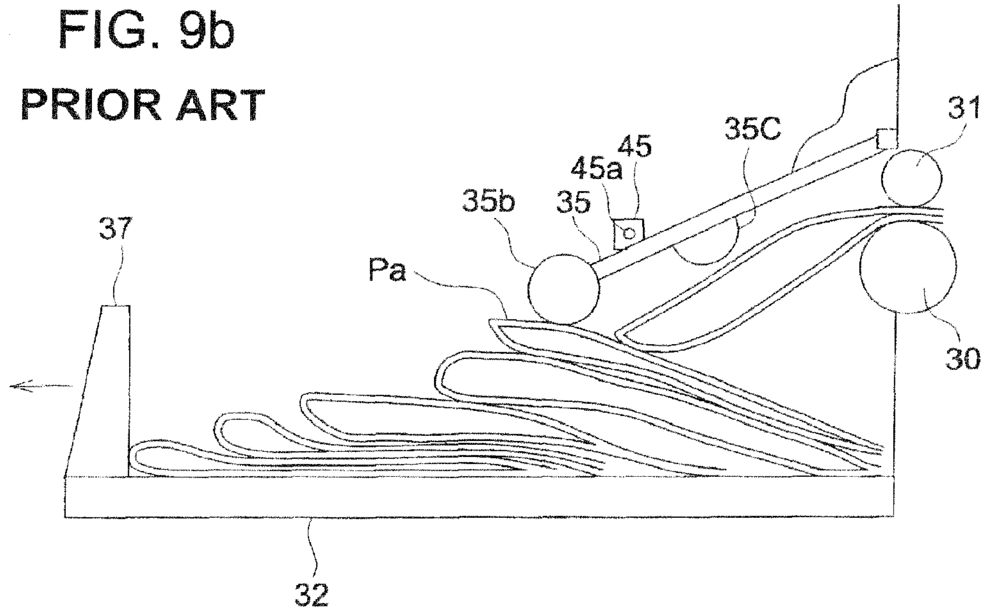
FIG. 9b PRIOR ART

Each of FIGS. 9*a* and 9*b* is a diagram showing the structure of the loading tray 32 and the operation of the loading stopper 37 disclosed by Unexamined Japanese Patent Application Publication No. 11-193162.

Figure 10:
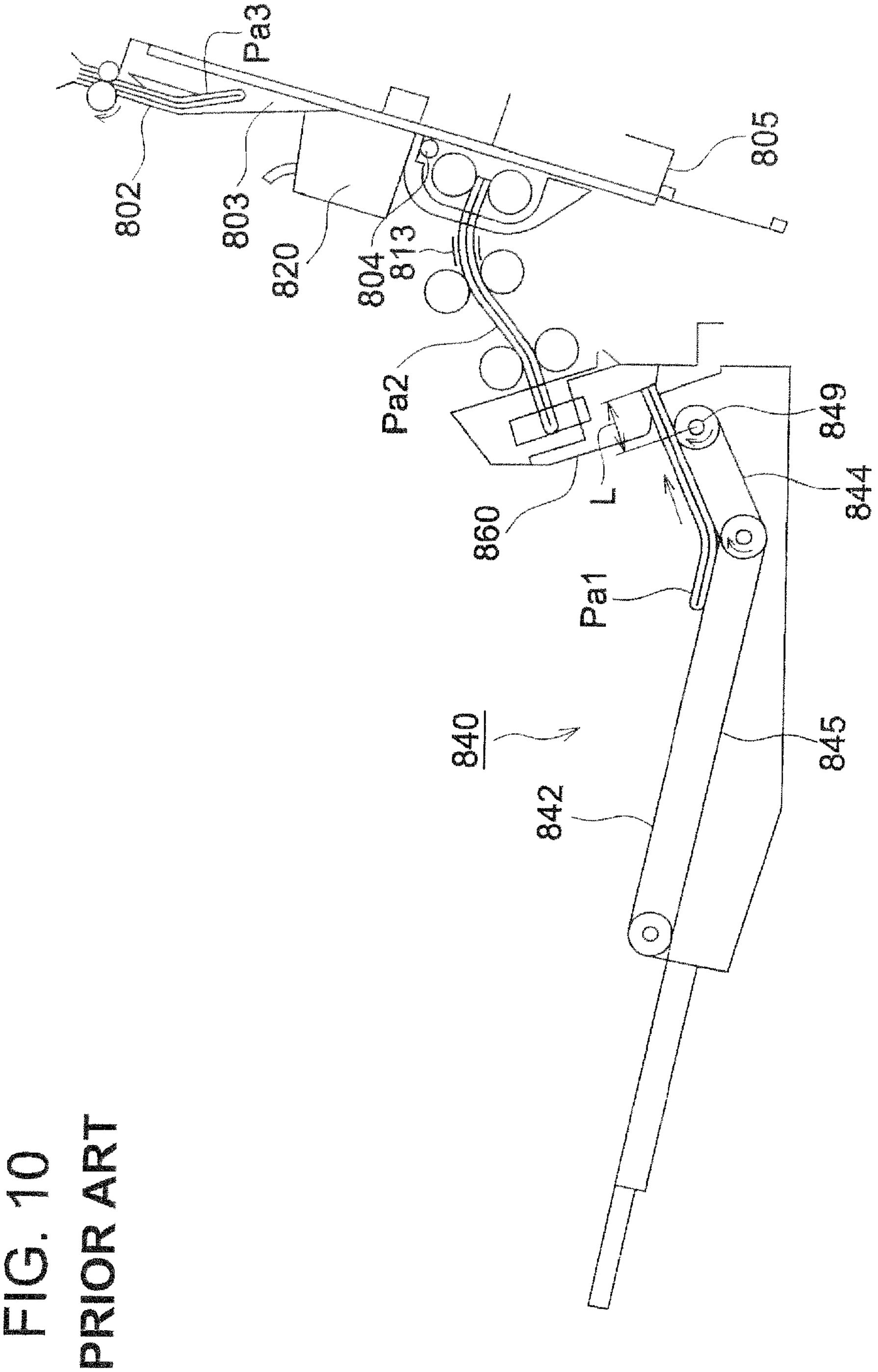
FIG. 10 PRIOR ART

FIG. 10 is a diagram for describing the operation of folding sheet bundle Pa1, Pa2, and Pa3 in the folded bundle tray 840 disclosed by Unexamined Japanese Patent Application Publication No. 2008-184311.

DETAILED DESCRIPTION OF THE PREFERRED EMBODIMENTS

Although the present invention is described based on the embodiments below, the present invention is not limited to this embodiment.

The same number is given to the structural element which has the same structure in each figure. In addition, in the following description, the perpendicular direction to the direction of travel of a sheet is described as the width direction. Moreover, "upstream" refers to the side from which a sheet is conveyed, and the downstream refers to the side to which a sheet is conveyed.

Figure 1:
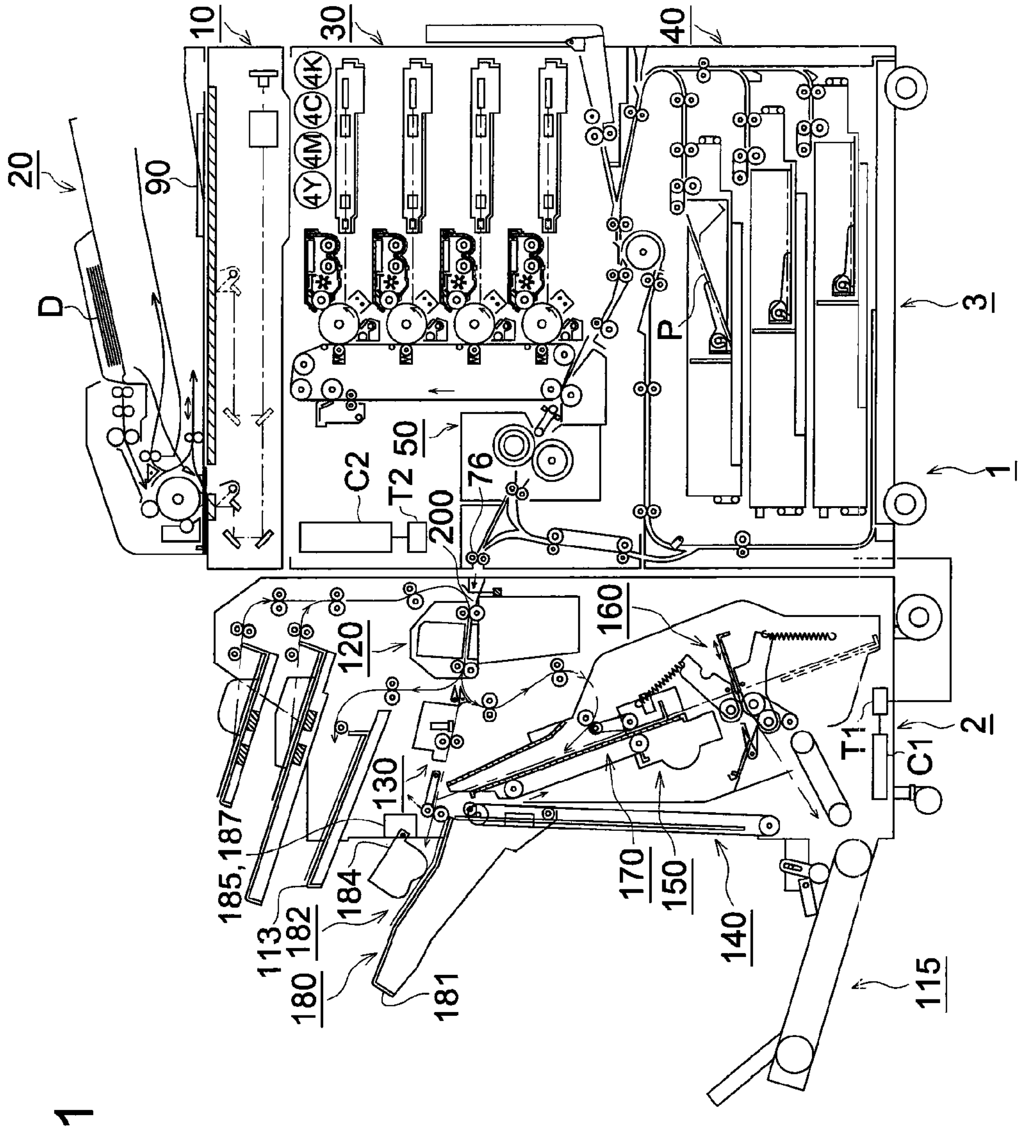
FIG. 1 is an explanatory diagram showing one example of an image forming system which has a post-processing apparatus and an image forming apparatus relating to the present invention.

FIG. 1 is an explanatory diagram showing one example of an image forming system which has the post-processing apparatus and image forming apparatus relating to the present invention.

The image forming system 1 relating to the present invention has the image forming apparatus 3 and the post-processing apparatus 2, and image forming is performed on the sheet P by the image forming apparatus 3, and an established post processing such as a stapling process is performed by the post-processing apparatus 2.

The image forming apparatus 3 of an electro photographic type has the document image reading section 10 which reads a document image, the document conveyance device 20 which conveys document D, the image forming section 30, a sheet feeder 40, the fixing unit 50, the operation panel 90, and the control device C2 that controls these.

The image forming section 30 performs image forming based on the document image information read by the document image reading section 10, and the sheet feeder 40 feeds the sheet P to the image forming section 30, and the fixing unit 50 fixes a toner image, and then the operation panel 90 has a display device and operation switches to input for the image forming operation.

The control device C2 includes a control board equipped with a CPU, a memory or the like and performs communication processing with the post-processing apparatus 2 through the communication device T2 to be described later while controlling an operation of each part of the image forming apparatus 3.

The post-processing apparatus 2 relating to the present invention has the punching section 120, the shifting section 130, the stapling section 150, the folding process section 160, a stacker 170, the elevation type sheet ejecting section 180, the sheet placement unit 115, and the control device C1 that controls operations of these.

The control device C1 includes a control board equipped with a CPU, a memory and performs communications processing with the image forming apparatus 3 through the communication device T1 to be described later while controlling an operation of each part of the post-processing apparatus 2.

the punching section 120 punches on the sheet P, and the shifting section 130 shifts the location of a sheet for every job, the stapling section 150 carries out the stapling process of the sheet bundle, the folding process section 160 folds a sheet bundle, and a stacker 170 accumulates a sheet temporarily and the elevation type sheet ejecting section 180 accumulates an ejected sheet or the like.

Moreover, the sheet placement unit 115 relating to the present invention is an apparatus for loading the sheet bundle which has been accumulated with the stacker 170 temporarily and has been folded in the folding process section 160. In addition, the elevation type sheet ejecting section 180 includes the elevation type sheet ejection tray 181 for loading the sheets which have been discharged and accumulated, and an aligning section 182 which aligns the sheet loaded on the elevation type sheet ejection tray 181 in the width direction.

Locations and heights of the image forming apparatus 3 and the post-processing apparatus 2 are adjusted and they are installed so that the sheet ejection roller 76 of the image forming apparatus 3 and the receiving section 200 of the post-processing apparatus 2 may agree with each other and the sheet P taken out from the image forming apparatus 3 can be received by the receiving section 200 of the post-processing apparatus 2.

The sheet P on which an image has been fixed is conveyed to the receiving section 200 of the post-processing apparatus 2 from the sheet ejection roller 76 of the image forming apparatus 3.

Moreover, the image forming apparatus 3 and the post-processing apparatus 2 have the communication device T2 of the image forming apparatus 3, and the communication device T1 of the post-processing apparatus 2, and transmits and receives a variety of information. For example, the information relating to the post processing established by the operation panel 90 of the image forming apparatus 3 is transmitted to the communication device T1 of the post-processing apparatus 2 through the communication device T2, and the post-processing apparatus 2 performs a post processing based on the transmitted information relating to the post processing. As for the sheet used by the image forming system 1, a paper sheet, an OHP sheet, or the like is cited.

The image forming apparatus 3 and the post-processing apparatus 2 of the image forming system 1 are detailed below.

Figure 2:
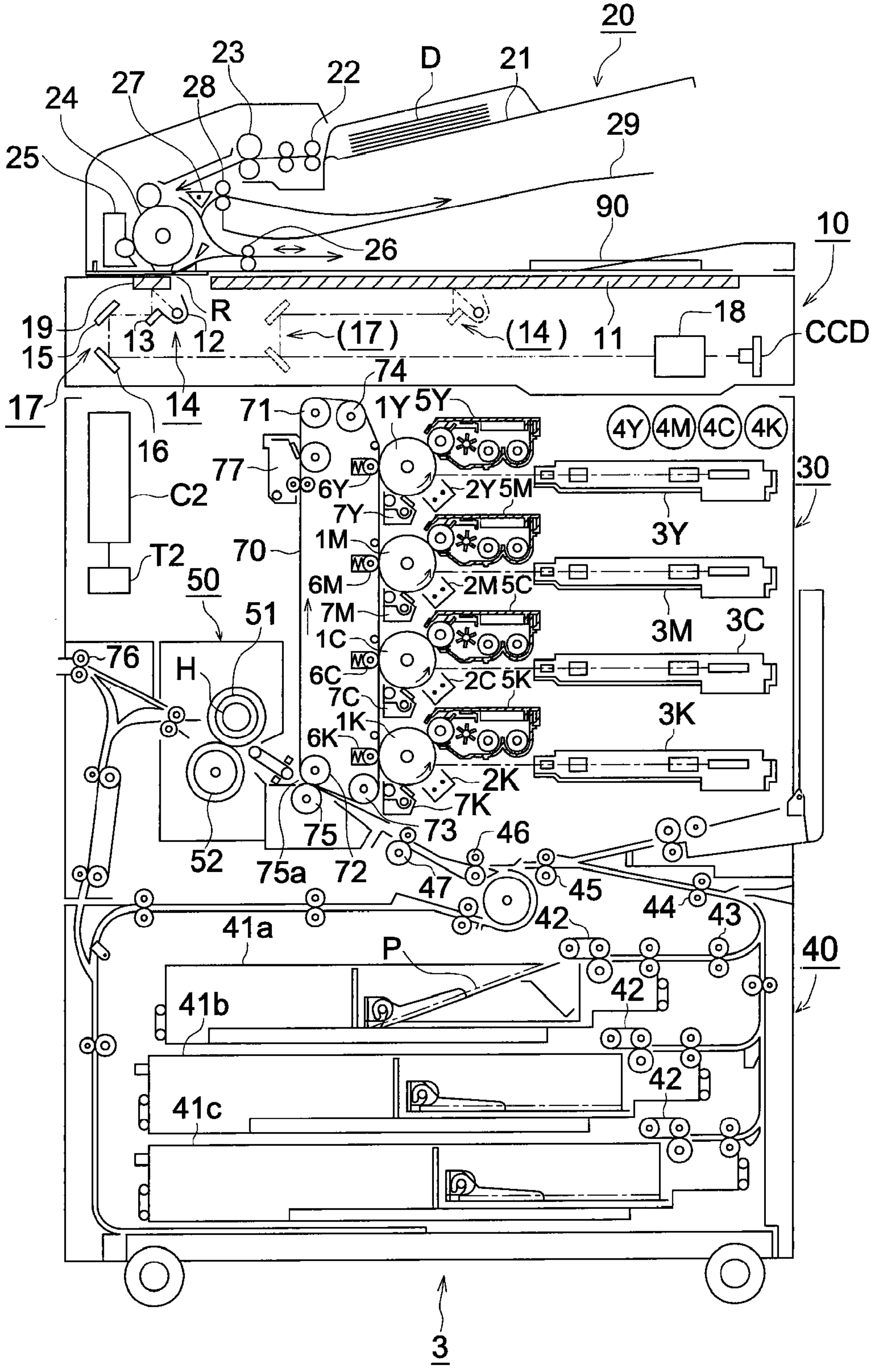
FIG. 2 is a schematic cross-sectional view showing one example of an image forming apparatus.

FIG. 2 is a schematic cross-sectional view showing one example of image forming apparatus. Description will be made below, referring to an image forming apparatus called a tandem-full-color copier as an example of image forming apparatus.

The document conveyance device 20 is an device which carries out separation feeding of every document D loaded on the sheet feed tray 21 one by one, conveys the document with a roller or others, and causes the document image reading section 10 to be described later to read the document image in the document reading region R and then discharges the document to the document ejection tray 29. To be more specific, separation feeding is carried out to every sheet of the document D loaded on the sheet feed tray 21 by an pair of feed-out rollers 22, and the sheet is sent to the resist roller pair 23 arranged at the downstream-side. Then, after Document D is conveyed along the outer periphery of the conveyance drum 24 while being guided by a guide 25 and others, and arrives at the document reading region R, it passes through the document reading region R. Further the direction of travel of the document D is reversed by the sheet reverse feeding roller 26, and the sheet is ejected by the sheet ejection roller 28 on the document ejection tray 29 while being guided by the switching guide member 27.

The document image reading section 10 reads the image of the document D conveyed by the document conveyance device 20, or the image of the document D placed on the platen glass 11. The document image reading section 10 includes the 1st scanning unit 14 that has the light source 12 and the 1st mirror 13, the 2nd scanning unit 17 that has the 2nd and 3rd mirrors 15 and 16, and the optical system 18 which carries out image forming of the document image on a line image sensor CCD.

When reading the image of the document D which is conveyed through the document reading region R by static optical system type reading operation, a document image is read by a line image sensor CCD of the 1st scanning unit 14 that is fixed in the lower part of the document reading region R.

When reading the image of the document D placed on the platen glass 11 by traveling optical system type reading operation, the 1st scanning unit 14 and 2nd scanning unit 17 travel in the sub scanning direction shown with a one-dot chain line (rightward in the figure) and the line image sensor CCD reads a document image during the traveling.

In an image processing section which is not illustrated, the analogue signal of the document image generated after photoelectric transduction is carried out by the line image sensor CCD is subjected to analog processing, A/D conversion, an image compression process, and others, and serves as digital image data for each Y (yellow), M (magenta), C (cyan), and K (black).

Drum-shaped photoreceptors (it is described also as the photoreceptors hereinafter) 1Y, 1M, 1C, and 1K of the 1st image carrier corresponding to each color of Y, M, C, and K are uniformly charged by the charging devices 2Y, 2M, 2C, and 2K corresponding to each color. The exposure device 3Y, 3M, 3C and 3K corresponding to each color, form a latent image in the corresponding photoreceptors 1Y, 1M, 1C, and 1K based on the digital image data for every color. The toner of each color is provided to the developing devices 5Y, 5M, 5C, and 5K from the toner replenishment devices 4Y, 4M, 4C, and 4K of each color which supplies fresh toner, and the latent image corresponding to each color formed on photoreceptors 1Y, 1M, 1C and 1K is visualized by the developing devices 5Y, 5M, 5C, and 5K.

The developing devices 5Y, 5M, 5C, and 5K and the photoreceptors 1Y, 1M, 1C, and 1K are aligned perpendicularly. The intermediate transfer body 70 which is the 2nd image carrier of the type of a semi-conductive endless belt wound around the rollers 71, 72, 73, and 74 rotatably is arranged on a side of the photoreceptors 1Y, 1M, 1C, and 1K. Then, the intermediate transfer body 70 is driven to rotate in the arrow direction by the roller 71 rotated by driving of the drive unit which is connected to the roller 71 and is not illustrated. The primary transfer rollers 6Y, 6M, 6C, and 6K corresponding to each color as a primary transfer device operate selectively according to the type of image, and presses the intermediate transfer body 70 against the corresponding photoreceptors 1Y, 1M, 1C, and 1K, respectively.

Thus, the toner image of each color formed on photoreceptors 1Y, 1M, 1C and 1K are sequentially transferred onto the intermediate transfer body 70 which rotates, and a compounded color image is formed. On the photoreceptors 1Y, 1M, 1C, and 1K, residual toner is removed by the cleaning device 7Y, 7M, 7C, and 7K after transferring a toner image to the intermediate transfer body 70 with the primary transfer rollers 6Y, 6M, 6C, and 6K.

The sheet feeder 40 which is a sheet supplying device has the 1st sheet supply cassette 41*a*, the 2nd sheet supply cassette 41*b*, and the 3rd sheet supply cassette 41*c* which are sheet storage members, and the sheet P is accommodated in each of the sheet cassettes. The sheet P accommodated in each sheet cassette is separated one by one by the sheet feed unit 42 and is conveyed to the secondary transfer region 75*a* through plural intermediate rollers 43, 44, 45, 46 and others and registration rollers 47.

The transfer of the toner image which has been made by compounding on the intermediate transfer body is carried out on the sheet P by the secondary transfer roller 75 at one time. In addition, only when the sheet P passes through this area and a secondary transfer is performed, a bias of the secondary transfer roller 75 is given towards a roller 72, and it presses the sheet P against the intermediate transfer body 70. On the intermediate transfer body 70 which carried out curvature separation of the sheet, residual toner is removed by the cleaning device 77 after transferring a color image on a sheet with the secondary transfer roller 75. Fixing treatment of the sheet which has the color toner image transferred is carried out by the fixing unit 50 which has a heating roller 51 which contains a heat source H and the pressure contact roller 52. The sheet on which the image has been fixed is pinched by the sheet ejection roller 76, and is provided to the post-processing apparatus 2 for downstream processes from an outlet.

The operation panel 90 into which an operator inputs a variety of information has a touch panel and various operation switches. The control device C2 displays the screen in which the information relating to a post-processing is set up or chosen on the touch panel of the operation panel 90. Moreover, the control device C2 reads the information relating to the post-processing set up or chosen on the screen and transmits it to the communication device T1 of the post-processing apparatus 2 through the communication device T2. As information about the post-processing, process information such as a shifting process, an aligning process, a binding process (stapling process), a folding process, punching process and job information such as a predetermined number of sheets (the number of shifted sheets or job completion number of sheets), the size information on a sheet, information of the sheet type are cited.

Figure 3:
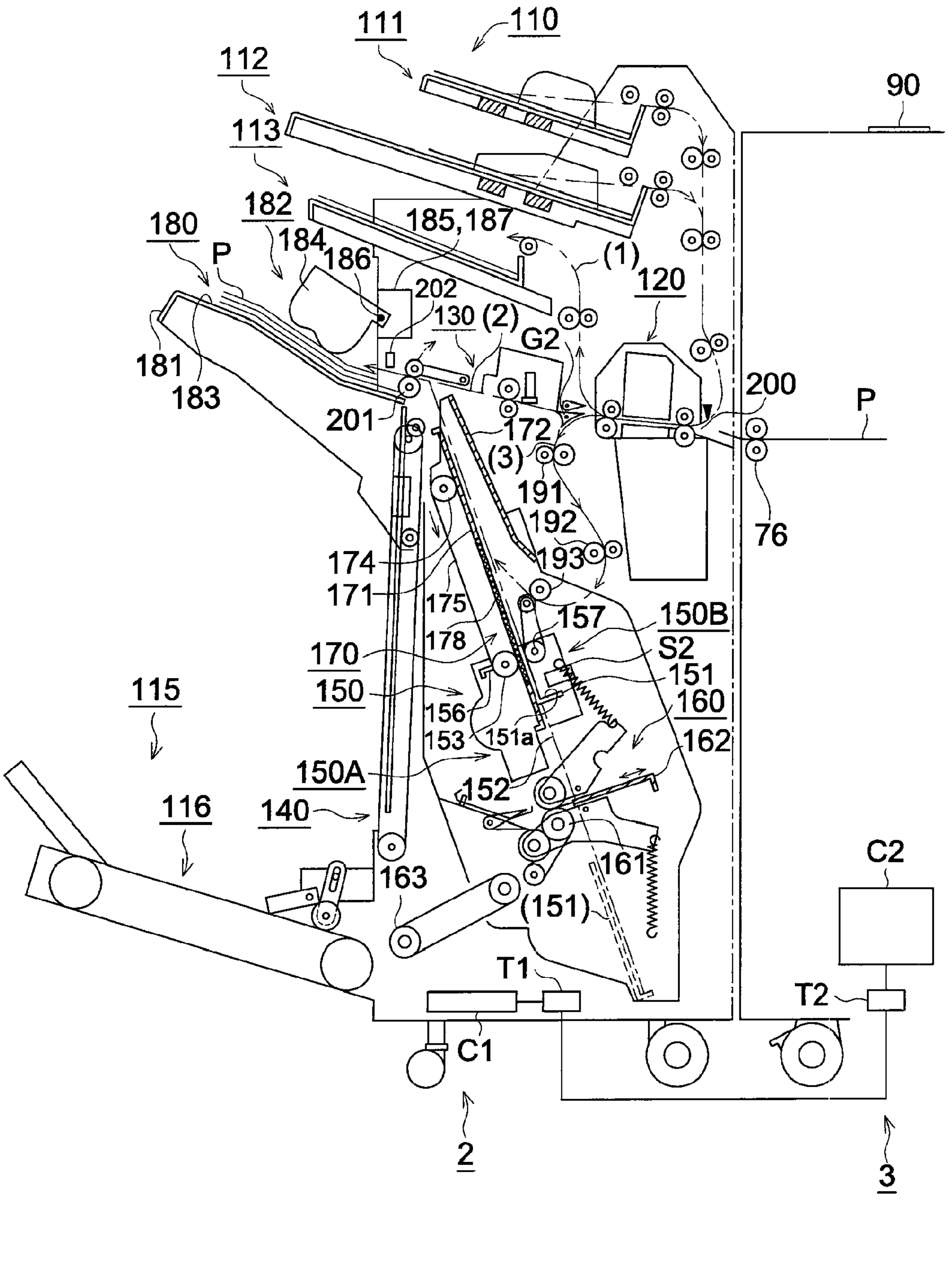
FIG. 3 is a cross-sectional structural diagram showing the structure of the embodiment of the post-processing apparatus relating to the present invention.

FIG. 3 is a cross-sectional structural diagram showing the structure of the embodiment of the post-processing apparatus relating to the present invention.

As a post processing of a sheet, a shifting process, an aligning process, a stapling process, a folding process and a punching process are cited, and the structure and operation of the post-processing apparatus relating to this embodiment will be described below by exemplifying a shifting process, an aligning process, a folding process, a stapling process, and an ejection of a sheet.

In the post-processing apparatus 2, the sheet feeder 110 which has the 1st sheet feed tray 111 and the 2nd sheet feed tray 112, and the fixed sheet ejection tray 113 are arranged on the upper part of the apparatus. In the middle part, the punch section 120 which is a punching device, the shift section 130 which is a shifting device to shift the sheet P in the width direction, and the discharge roller 201 which discharges a sheet or the like towards the elevation type sheet ejecting section 180 are arranged. In the lower part, a stapling section 150 which is a stapling device, a folding process section 160 which is a folding device, and a stacker 170 which accumulates sheets temporarily, are arranged along the same inclined plane. Moreover, on the left-hand side of the post-processing apparatus 2 in the figure, the elevation type sheet ejecting section 180 which has the elevation type sheet ejection tray 181 and the aligning section 182, the sheet placement unit 115 relating to the present invention which accumulates the sheet bundle to which the folding process has been carried out are arranged.

In addition, the elevation type sheet ejection tray 181 is movable vertically in the figure by the sheet ejection tray moving section 140 which moves the elevation type sheet ejection tray 181 parallel to the accumulation direction of sheets (up and down directions in the figure). The aligning section 182 has a pair of aligning plates 184 which urges the ends of a sheet to the width direction, a pair of width direction drive units 185 which move a pair of aligning plates 184 to the width direction, and the turning drive unit 187 which swings a pair of aligning plates 184 around a rotating shaft 186. Then, when the pair of aligning plates 184 performs alignment, displacement of a prescribed distance of them in the opposite direction to each other is made by the pair of width direction drive units 185 to urge the sheet so that a sheet may be nipped from both sides in the width direction. Further, at the time of the shift operation, displacement of a prescribed distance of them is made in the same direction, and aligning of the sheet can be carried out at the location after the displacement, namely, the location to which the sheet has shifted. Furthermore, at the time of the shift operation, the turning drive unit

187 swings a pair of aligning plates 184 around the rotating shaft 186 clockwise to make the lower edges of the aligning plates evacuate upward from the uppermost sheet surface, and swings the aligning plates 184 counterclockwise, and makes them lower.

As described above, the aligning process of the aligning plates is made possible by carrying out a reciprocation movement of a prescribed distance of the pair of aligning plates 184 in the direction opposite to each other by the pair of width direction drive units 185. Moreover, shift processing of the aligning member is carried out by carrying out displacement of a prescribed distance of the pair of aligning plates 184 to the same direction by the pair of width direction drive units 185, and swinging the pair of aligning plates 184 clockwise and a counterclockwise by the turning drive unit 187.

The sheet P to which fixing treatment has been carried out in the image forming apparatus 3 is sent into the receiving section 200.

When the punching process is set, the sheet P sent into the receiving section 200, a punch hole is made in the punch section 120, and the sheet P is conveyed toward the switching gate G2. When the ejection to the fixed sheet ejection tray 113 is set up, the switching gate G2 opens the transportation route to the fixed sheet ejection tray 113, sends the sheet P into the 1st conveyance path (1), and allow the sheet P to travel towards the fixed sheet ejection tray 113, to be discharged to the fixed sheet ejection tray 113. When a shift process is set, the switching gate G2 opens the transportation route to the shift section 130, sends the sheet P into the 2nd conveyance path (2) to be conveyed towards the shift section 130. In the shift section 130, a shift is carried out toward the right or left of the width direction of the sheet P for a predetermined quantity for every predetermined number of sheets, and the sheet P is conveyed towards the elevation type sheet ejection tray 181. This predetermined quantity and direction correspond to the shift amount and direction of the aligning plates 184.

When the stapling process or the folding process is set, the switching gate G2 opens the transportation route to a stacker 170, sends the sheet P into the 3rd conveyance path (3), and allows it to be conveyed towards the stacker 170. When the stapling process is set, a predetermined number of sheets to be stapled are stacked in the stacker 170, and a stapling process for the sheets is performed in the staple section 150. The stapled sheets are then conveyed to the elevation type sheet ejection tray 181 to be discharged to the elevation type sheet ejection tray 181. When the folding process is set, the folding process is performed to the stapled sheets in the folding process section 160 and the sheets which have become a booklet form are conveyed to the sheet placement unit 115 to be discharged on the sheet bundle tray 116 of the sheet placement unit 115.

The detailed structure and the detailed operation of the sheet placement unit 115 relating to the present invention will be described later.

When the aligning process is set, the sheet discharged on the elevation type sheet ejection tray 181 with the discharge roller 201 is aligned one by one by the reciprocation movement of the aligning plates 184 by the width direction drive units 185. When shift processing is set, in order to set the pair of aligning plates 184 to the position of the sheet shifted by the shift section 130, the aligning plates are shifted by making the pair of aligning plates 184 retreat from the uppermost surface of a sheet, and making a shift in the same direction by a prescribed distance, respectively. "Prescribed distance" mentioned here means the amount of shift of the sheet in the shift section 130.

The sheet sensor 202 which detects the sheet discharged to the elevation type sheet ejection tray 181 is provided near and downstream of the discharge roller 201 and when the sheet sensor 202 detects a passage of a sheet, detection information is inputted into the control device C1. The elevation type sheet ejection tray 181 is moved by the sheet ejection tray moving section 140 so that the height of the sheet contact surface 183 or the height of the uppermost surface of the upstream side of the sheets accumulated on the elevation type sheet ejection tray 181 may become a height which does not cause the abnormality of discharge with respect to the height of sheet discharged by the discharge roller 201. In addition, the elevation type sheet ejection tray 181 may be so constituted as to be movable in the width direction by the width direction transportation device (un-illustrating) which moves the elevation type sheet ejection tray 181 to the width direction (the directions of front and back in the figure). When the elevation type sheet ejection tray 181 is movable to the width direction, since the shift of a sheet is performed by the elevation type sheet ejection tray 181, the shift section 130 which shifts a sheet is unnecessary. Further, since the turning of the aligning plates 184 upward is attained on the elevation type sheet ejection tray 181 and the aligning plates 184 are movable (namely, shiftable) in the width direction with the elevation type sheet ejection tray 181, the width direction drive unit 185 also becomes unnecessary.

FIG. 4 is a schematic diagram showing the composition of the sheet placement unit 115 relating to the present invention. FIG. 4*a* is a cross-sectional view of the sheet placement unit 115, and FIG. 4*b* is viewed from A in FIG. 4*a*.

The sheet placement unit 115 relating to the present invention is composed of the sheet bundle tray 116 as the sheet placement section, and the sheet holding mechanism 117 as a sheet holding device. The sheet bundle tray 116 is constituted of a sheet bundle tray body 116A, a sheet bundle auxiliary tray 116E, and a sheet conveyance device (with no referential mark) and others. A sheet conveyance device includes the sheet conveyance belt 116B, the belt driving roller 116C, the belt follower roller 116D, and a driving motor which is not illustrated and drives the belt driving roller 116C. The sheet bundle tray body 116A is provided to be inclined so that the downstream side may become higher than the other side in the sheet conveying direction from the left-hand side surface of the post-processing apparatus 2 towards the outside.

The belt driving roller 116C and the belt follower roller 116D are provided rotatably in the sheet bundle tray body 116A, are wound around by the sheet conveyance belt 116B whose slope is equivalent to the slope of the sheet bundle tray body 116A, and hold the sheet conveyance belt 115B rotatably. The belt driving roller 116C is provided on the inclined sheet bundle tray body 116A on the downstream side in the sheet conveying direction, is connected with the above-mentioned driving motor, and is rotated. The belt follower roller 116D is located near the left-hand side of the post-processing apparatus 2, and a rotation by following is carried out with the sheet conveyance belt 116B through the belt driving roller 116C. Moreover, inside the belt follower roller 116D, a sheet position sensor PS as a sheet position detecting device is provided. The sheet bundle auxiliary tray 116E is provided at the downstream side of the sheet bundle tray body 116A in the sheet conveying direction, and it has a larger inclination than the inclined sheet bundle tray body 116A. When many sheet bundles Pa are loaded on the sheet bundle tray body 116A and are conveyed with the sheet conveyance belt 116B, the sheet bundle auxiliary tray 116E prevents the drop of sheet bundle Pa from the sheet bundle tray 116, and it also has a function of keeping the interval between the sheet bundles Pa properly.

The sheet holding mechanism 117 as a sheet holding device relating to the present invention is provided above the sheet bundle tray 116. the sheet holding mechanism 117 includes the center holding member 118 as a main sheet holding device, a pair of right-and-left holding members 119 as a sub-sheet holding device, and the hold member 117A which holds the center holding member 118 and the right-and-left holding member 119. The fixed shaft Jk1 which is provided on the left-hand side face of the post-processing apparatus 2 and holds the center holding member 118 swingably, and fixed shaft Jk2 which holds a pair of right-and-left holding members 119 slidably or swingably are fixed to the hold member 117A. Moreover, stopper shafts St1 and St2 which restrict the moving range where the center holding member 118 swings and stopper shafts St3 and St4 which restrict the moving range where a pair of right-and-left holding members 119 slide or swing are fixed to the hold member 117A.

A rotation center hole (with no referential mark) is formed near one end of the center holding member 118, and this rotation center hole fits to fixed shaft Jk1 fixed on the hold member 117A, and it is held swingably. Further, a sheet contacting edge section 118*a* as the 1st contacting section that comes in contact with the sheet bundle Pa is formed in the other end of the sheet of the center holding member 118, a pit section (with no referential mark) is formed near sheet contacting edge section 118*a*, and a mass adjusting member SC is inserted in the pit section. The mass of mass adjusting member SC is set as a proper value according to the type, size, basis weight of the sheet which forms a sheet bundle, the number of sheets and the like.

When plural sheet bundles Pa are loaded, the center holding member 118 has a function to prevent collapse of sheet bundle Pa, while it presses down the upper surface of sheet bundle Pa and regulates the swell of the folding section, when sheet bundle Pa is discharged on the sheet bundle tray 116.

A pair of right-and-left holding members 119 are provided on the upstream side of the center holding member 118 in the sheet conveying direction, and it has sheet holding rollers 119A as the 2nd sheet contacting section that comes in contact with sheet bundle Pa and slide member 119B for holding the sheet holding rollers 119A rotatably. Each of the sheet holding rollers 119A has a hole (with no reference symbol) at the center which fits to the rotary shaft 119C fixed to the slide member 119B, and is held rotatably by the slide member 119B.

The slide member 119B has rotary shaft 119C which fits to sheet holding roller 119A near the one end of the slide member 119B and an oblong hole (with no reference symbol) which makes an engagement slidably and swingably to the fixed shaft Jk2 which is fixed to the hold member 117A near the other end of the slide member 119B. Since fixed shaft Jk2 alone holds the slide member 119B through this oblong hole, the slide member 119B can also rotate around the fixed shaft Jk2 while sliding in the longitudinal direction of an oblong hole. The extent of rotation is within a tracking area until the side face of the slide member 119B bumps into the stopper shafts St3 and St4. That is, with respect to the hold member 117A, the center holding member 118 is held swingably around the rotary shaft Jk1, and a pair of right-and-left holding members 119 is held swingably and slidably around fixed shaft Jk2.

When sheet bundle Pa which includes a small number of sheets P is discharged to the sheet holding mechanism 117, by sliding along with the above-mentioned oblong hole, a pair of right-and-left holding members 119 pushed by the upper surface of sheet bundle Pa press the sheet bundle Pa by a fixed pressure, and regulate the opening of the folding section of sheet bundle Pa. Moreover, since the pair of right-and-left holding members 119 press the sheet bundle Pa against the sheet conveyance belt 116B, it is effective in increasing the frictional force of sheet bundle Pa and the sheet conveyance belt 116B, and increasing the conveying force of the sheet conveyance belt 116B.

On the other hand, when sheet bundle Pa which includes many sheets P or thick sheets P is discharged to the sheet holding mechanism 117, since a pair of right-and-left holding members 119 pushed by the upper surface of sheet bundle Pa are greatly swung toward the stopper shaft St4, they do not hinder the conveyance of the sheet bundle Pa. Further, since a pair of right-and-left holding members 119 comes in contact with the stopper shaft St4 and the location of sheet holding roller 119A is regulated when sheet bundle Pa which includes a number of sheets especially, or the sheet bundle which includes a thick sheet with extreme thickness is discharged, excessive opening of sheet bundle Pa at the folding section is restricted.

Next, positional relationship of the fixing position of the member which constitutes the sheet placement unit 115 of this embodiment and sheet bundles Pa1, Pa2 and Pa3 discharged on the sheet placement unit 115 will be described referring to FIG. 5.

FIG. 5 is a schematic diagram for illustrating the state where the sheet bundle provided with a folding process is discharged on the sheet placement unit 115.

FIG. 5*a* is a figure showing the state where first sheet bundle Pa1 is conveyed with the folding section being the leading edge, and begins to be discharged on the sheet placement unit 115. FIG. 5*b* is a figure showing the state where the first sheet bundle Pa1 to be ejected is the sheet bundle of the sheet of the maximum size among the sheets which can be used and the sheet bundle Pa1 is discharged on the sheet bundle tray 116, and then the sheet conveyance belt 116B is stopped after the trailing edge is detected.

In FIG. 5*a*, when the first sheet bundle Pa1 has not arrived at the location of the center holding member 118, the center holding member 118 is in the state where it is kept in contact with the stopper shaft St1. The location of this stopper shaft St1 is set so that a predetermined clearance "d" may be formed between the sheet contacting edge section 118*a* as the 1st sheet contacting section of the center holding member 118 and the sheet conveyance belt 116B.

The value of the predetermined clearance "d" is calculated by experimentation, and even if the bundle of the sheet Pa1 discharged is a bundle of thin sheets of low stiffness, it is set as a value so that sheet contacting edge section 118*a* may not block the conveyance of sheet bundle Pa1 when sheet bundle Pa1 passes the center holding member 118.

In FIG. 5*b*, the part extending to the upper side from the folding section at the leading edge of sheet bundle Pa1 is called folding section upper side Pa1*a*, and the part extending to the lower side is called folding section lower side Pa1*b*. The Symbol EP represents the detecting position of sheet position sensor PS, and symbol TP represents the location where the maximum portion of the swell of this sheet bundle Pa1 exists, when discharging sheet bundle Pa1 composed of the largest sheet that can be used for the sheet placement unit 115 relating to this embodiment to the sheet placement unit 115.

When the trailing edge of this sheet bundle Pa1 reaches the detecting position EP, the center holding member 118 is set up so that the sheet contacting edge section 118*a* may come in contact with the sheet bundle Pa1 at the predetermined distance L on the upstream side from the location TP where the maximum of the swell of this sheet bundle Pa1 is present.

The predetermined distance L here is a value calculated by experimentation, and it is set as the value which can realize good loading also to sheet bundle Pa of severe requirements for loading including a case where the bundle has a number of sheets, or a thick sheet.

In this embodiment, the sheet of the maximum size is set as double letter longitudinal size (the length of a sheet in the conveying direction: 432 mm, length of a width direction: 279 mm), and for the sheet bundle of this sheet it is set up so that the predetermined distance L may be about 10 mm.

When the center holding member 118 comes in contact with this sheet bundle Pa1, the sheet holding rollers 119A of the pair of right-and-left holding members 119 press down the position on the upstream side in the sheet conveying direction from the location of folding section upper side Pa1*a* which the center holding member 118 presses down.

When the trailing edge of sheet bundle Pa1 is detected by sheet position sensor PS at the detecting position EP, the operation of the driving motor which is not illustrated is controlled, and the sheet conveyance belt 116B is suspended, and then sheet bundle Pa1 stops temporarily. This stopping location is called the prescribed standby position here.

When the 1st sheet bundle Pa1 to precede is in a prescribed standby location, the subsequent 2nd sheet bundle Pa2 is in a location just before the point where the leading edge of the bundle reaches the sheet placement unit 115. After subsequent sheet bundle Pa2 is discharged and the leading edge of the bundle laps with the trailing edge of the sheet bundle Pa1 while the preceding sheet bundle Pa1 is at a standstill, the sheet conveyance belt 116B is operated again, and sheet bundle Pa1 is conveyed in the sheet conveying direction from the stopping location in the state where it lapped with sheet bundle Pa2.

In FIG. 5*b*, even if the sheet conveyance belt 116B stops, since the edge of the center holding member 118 is pressing down the swell section of sheet bundle Pa1, the sheet bundle Pa1 does not slide down in the opposite direction of the sheet conveying direction on the inclined sheet conveyance belt 116B. Moreover, since the sheet holding rollers 119A of the right-and-left holding member 119 press down the upper surface of the folding section upper side Pa1*a* of sheet bundle Pa1, the opening of the folding section of sheet bundle Pa1 at a position near the detecting position EP is restricted, and the problem that the leading edge of bundle of sheet bundle Pa2 which follows enters into the above-mentioned opening is not created.

FIG. 5*c* is a figure showing the state where plural sheet bundles Pa1 and Pa2 have been discharged on the sheet bundle tray 116, and subsequent sheet bundle Pa3 begins to be discharged on the sheet bundle tray 116.

In FIG. 5*c*, since sheet bundle Pa2 which follows is loaded on the sheet bundle Pa1 having discharged first to overlap with it, sheet bundle Pa2 tends to shift in the opposite direction of the sheet conveying direction easily, and in the case of the sheet bundle of large size like double letter longitudinal size or A3 size, this tendency becomes strong especially.

According to the structure of the present invention, for the sheet bundle of large size, since the center holding member 118 presses down a part at the position shifted upstream in the sheet conveying direction from the uppermost top of the swell section of sheet bundle Pa2, the slippage to the upstream direction is restricted and the problem that loading of sheet bundle Pa1 and Pa2 collapses is not created. Moreover, since sheet holding rollers 119A of the right-and-left holding member 119 press the sheet bundles Pa1 and Pa2 against the sheet conveyance belt 116B, the sheet conveying force of the sheet conveyance belt 116B becomes high, and proper loading of sheet bundles Pa1 and Pa2 is helped.

By using the center holding member 118 as a main sheet holding device, the collapse of the loaded sheet bundle which occurs easily when the sheet bundle of large size like A3 size is used can be prevented. Moreover, because the right-and-left holding members 119 as a sub-sheet holding device are used, the opening of the folding section of sheet bundle Pa is restricted, and occurrence of the problem that the leading edge of a consecutive sheet bundle enters into the above-mentioned opening can be prevented. Furthermore, occurrence of the problem of pushing out the preceding sheet bundle Pa1 because the leading edge of the subsequent sheet bundle Pa2 strikes the trailing edge of the preceding sheet bundle Pa1 can also be prevented. Furthermore, it becomes possible to form stabilized loading of sheet bundle Pa continuously as shown in FIG. 5*c* by using the sheet holding mechanism 117 relating to the present invention.

FIG. 6 is a schematic diagram for describing the state where the sheet bundle whose size is small and which has been subjected to a folding process is discharged on the sheet placement unit 115.

FIG. 6*a* is a figure showing the state where the sheet bundle Pa1 is at a standstill after arriving at the prescribed standby position after the first sheet bundle Pa1 has been discharged on the sheet bundle tray 116, the trailing edge of the sheet bundle Pa1 is detected, and the sheet conveyance belt 116B stopped. FIG. 6*b* is a figure showing the state where while plural sheet bundles Pa1, Pa2, and Pa3 have been discharged and stop on the sheet bundle tray 116, subsequent sheet bundle Pa4 is being discharged on the sheet bundle tray 116 to start to overlap with them.

In FIG. 6*a*, when the sheet conveyance belt 116B stops, the leading edge of the first sheet bundle Pa1 does not reach the center holding member 118, but the swell section on the top face of folding section upper side Pa1*a* is in the location to be pressed down by the sheet holding rollers 119A. As shown in FIG. 6*a*, the 1st sheet bundle Pa1 is in the state where the leading edge of the bundle has not reached the center holding member 118, even when the trailing edge has reached the detecting position EP, but has reached the right-and-left holding members 119. Therefore, it does not slide on the surface of the sheet conveyance belt 116E which inclines, to return to the opposite direction of the sheet conveying direction when the sheet conveyance belt 116B stopped due to detection of the trailing edge of sheet bundle Pa1.

Further, subsequent sheet bundle Pa2 is at a location just before where the leading edge of the bundle reaches the sheet placement unit 115 at this time. Then, after the subsequent sheet bundle Pa2 is discharged on the sheet placement unit 115 and it overlaps with sheet bundle Pa1, the sheet conveyance belt 116B is operated again, and sheet bundle Pa1 is conveyed in the sheet conveying direction.

As shown in FIG. 6*b*, when the 1st sheet bundle Pa1 and the 2nd sheet bundle Pa2 are loaded to reach the location of the center holding member 118 and the 3rd sheet bundle Pa3 is conveyed in a pile, the leading edge of sheet bundle Pa3 may not have reached the center holding member 118. Also in this case, since the sheet bundle Pa3 is pressed down by the right-and-left holding members 119, it does not slide down from the top of loading of sheet bundles Pa1 and Pa2 to return to the opposite direction of the sheet conveying direction.

According to the present invention, even when the sheet bundle Pa is a sheet bundle of small sized sheets and the leading edge of the bundle positioned at the prescribed standby location has not arrived at the location of the center holding member 118, the slippage from loading of a sheet bundle can be prevented by pressing down of the right-and-left holding members 119 of the 2nd holding device.

As stated above, proper loading becomes possible, without collapsing of the sheet bundles of sizes from the large size to small size by using the sheet holding mechanism 117 relating to the present invention.

FIG. 7 is a block diagram for controlling the operation of the embodiment of the sheet placement unit relating to the present invention.

In FIG. 7, the control device C1 drives operations of belt driving motor MT based on the detection signal from the sheet position sensor PS which detects the arrival of the leading edge and trailing edge of the sheet bundle Pa at the detecting position, when sheet bundle Pa reaches the sheet placement unit 115. That is, after the trailing edge of sheet bundle Pa reaches the detecting position EP, a detection signal is sent from the sheet position sensor PS, and the control device C1 stops the rotation of belt driving motor MT.

FIG. 8 is a flow chart for describing the process of the operation for the embodiment of the sheet placement unit relating to the present invention.

According to a series of jobs instructed through the control device C1, the first sheet bundle Pa1 for which a folding process has been carried out by the post-processing apparatus 2 is discharged on the sheet placement unit 115 (Step 11).

Next, when the leading edge of sheet bundle Pa1 reaches the detecting position EP of the sheet position detecting sensor PS, The sheet position detecting sensor PS sends a signal to the control device C1, and the control device C1 which has received the signal rotates the belt driving motor MT to rotate the sheet conveyance belt 116B, and conveys sheet bundle Pa1 (Step 12). However, the signals for rotating belt driving motor MT may be signals acquired by the other devices, such as a signal which is formed in a sensor at the downstream-side of the folding section in the post-processing apparatus 2.

When the trailing edge of the sheet bundle Pa1 reaches the detecting position EP of the sheet position detecting sensor PS, the sheet position detecting sensor PS sends a signal to the control device C1 (Step 13).

In response to the signal sent from the position detecting sensor PS, the control device C1 stops the rotation of the belt driving motor MT, and sheet bundle Pa1 stops at the prescribed standby position (Step S14).

Then, the 2nd sheet bundle Pa2 which follows is discharged on the sheet placement unit 115 (Step 15).

When the leading edge of the 2nd sheet bundle Pa2 reaches the detecting position EP of the sheet position detecting sensor PS, sheet position detecting sensor PS sends a signal to the control device C1. The control device C1 operates the belt driving motor MT at a timing so that the leading edge of the 2nd sheet bundle Pa2 may overlap with a proper location of the trailing edge of the 1st sheet bundle Pa1 to rotate the sheet conveyance belt 116B and conveys the sheet bundle Pa1 and sheet bundle Pa2 while being piled up (Step S16). The timing for making the 1st sheet bundle Pa1 and the 2nd sheet bundle Pa2 to be conveyed in a pile is set up to be an amount calculated by experimentation beforehand to make a suitable overlap. The setting of this amount of laps is performed by adjusting time until when it starts to operate the belt driving motor MT from when the sheet position detecting sensor PS detects the leading edge of the 2nd sheet bundle Pa2 by using a timer or the like.

When the trailing edge of the Nth sheet bundle PaN reaches the detecting position EP of the sheet position detecting sensor PS, the sheet position detecting sensor PS sends a signal to the control device C1 (Step 17).

The control device C1 judges whether the Nth sheet bundle PaN which has reached the detecting position EP is the last sheet bundle of a series of jobs in response to the signal sent from the sheet position detecting sensor PS (Step 18).

When the Nth sheet bundle PaN is not the last sheet bundle (Step 18 negation), the control device C1 repeats the processes after Step S12 after returning the processing to Step S12. When the Nth sheet bundle PaN is the last sheet bundle (Step 18 affirmation), the control device C1 advances the processing to Step S19, and stops the rotation of belt driving motor MT (Step S19), and the terminates the operation of a series of jobs.

In addition, although only the sheet bundle having been provided with a folding process is described in this embodiment. Of course, the present invention is applicable also to the sheet bundle having been provided with a shift process, an aligning process, a binding process, or a punching treatment in addition to the folding process.

If the sheet placement unit relating to the present embodiments is used, even when a sheet bundle which has been provided with a folding process by folding thick sheets or a number of sheets is used, there is an advantage that proper loading without turbulence and collapse of the lap of stack of sheet bundles is attained at the time of stacking and since the sheet placement unit has the inclined sheet ejection tray, the workability for taking out the sheets is enhanced. Moreover, the sheet placement unit with a low manufacturing cost which has high conveyance performance and few troubles can be offered due to the conveyance of sheet bundles by using a sheet conveyance belt.

What is claimed is:

1. A sheet placement unit on which a plurality of sheet bundles are to be loaded so that the plurality of sheet bundles are overlapped, each sheet bundle of the plurality of sheet bundles having been produced by performing a folding process on a plurality of sheets, the sheet placement unit comprising:

a sheet placement section on which a sheet bundle of the plurality of sheet bundles is loaded, the sheet placement section being inclined so that a downstream side of the sheet placement section in a sheet conveying direction is higher than another side;

a sheet conveyance device to convey the sheet bundle loaded on the sheet placement section in the sheet conveying direction while the plurality of sheet bundles are overlapped thereon;

a sheet holding device provided swingably above the sheet placement section, the sheet holding device comprising a sheet contacting section which is arranged to contact an upper surface of the sheet bundle loaded on the sheet placement section, wherein the sheet contacting section is slidably movable in a direction intersecting a plane defined by the sheet conveying direction and a width direction of the sheet bundle that is loaded on the sheet placement section;

a sheet position detecting device for detecting that a trailing edge of the sheet bundle has arrived at a predetermined standby position of the sheet placement section; and a first control device which makes the sheet conveyance device convey the sheet bundle having been loaded on the sheet placement section in the sheet conveying direction when a subsequent sheet bundle is loaded on the sheet placement section and is overlapped on the sheet bundle having already been loaded, and which stops the sheet conveyance device when the sheet position detecting device detects that a trailing edge of the subsequent sheet bundle has arrived at the predetermined standby position;

wherein the sheet bundle has a folding section which includes a leading edge of the sheet bundle;

wherein the sheet placement unit further comprises a first sheet contacting section which is arranged to contact the upper surface of the sheet bundle, and which is provided such that, when a length of the sheet bundle in the sheet conveying direction is a maximum length among lengths of sheet bundles which are conveyable on the sheet conveyance device, the first sheet contacting section contacts a point at a predetermined distance on an upstream side in the sheet conveying direction from a top of a swell formed on an upper side of the folding section of the sheet bundle when a trailing edge of the sheet bundle having the maximum length in the sheet conveying direction stops at the predetermined standby position;

wherein the sheet contacting section is a second sheet contacting section which is provided such that, when a length of the sheet bundle in the sheet conveying direction is a minimum length among lengths of sheet bundles which are conveyable on the sheet conveyance device, the second sheet contacting section contacts the sheet bundle when a trailing edge of the sheet bundle having the minimum length in the sheet conveying direction stops at the predetermined standby position; and wherein the second sheet contacting section is arranged to always be in contact with the sheet bundle loaded on the sheet placement section.

2. The sheet placement unit of claim 1, wherein when the sheet bundle is not placed on the sheet placement section, a predetermined clearance is formed between the first sheet contacting section and the sheet conveyance device.

3. The sheet placement unit of claim 1, wherein the second sheet contacting section comprises a roller held rotatably.

4. A post-processing apparatus comprising:

a folding device for performing the folding process on the plurality of sheets to form the sheet bundle; and the sheet placement unit of claim 1.

5. An image forming system comprising:

the post-processing apparatus of claim 4; and an image forming apparatus, wherein the image forming apparatus comprises:

a plurality of mechanism sections for forming an image on a sheet; and a second control device which controls an operation of the plurality of mechanism sections and which is capable of communication with the first control device.

6. The sheet placement unit of claim 1, wherein the second sheet contacting section is arranged to contact the upper surface of the sheet bundle at both side portions of the sheet bundle, simultaneously, with respect to the width direction.

* * * * *